US012273700B2

(12) United States Patent
Falk

(10) Patent No.: US 12,273,700 B2
(45) Date of Patent: Apr. 8, 2025

(54) SEAMLESS RENDERING OF AUDIO ELEMENTS WITH BOTH INTERIOR AND EXTERIOR REPRESENTATIONS

(71) Applicant: Telefonaktiebolaget LM Ericsson (publ), Stockholm (SE)

(72) Inventor: Tommy Falk, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 280 days.

(21) Appl. No.: 18/014,987

(22) PCT Filed: Jul. 7, 2021

(86) PCT No.: PCT/EP2021/068833
§ 371 (c)(1),
(2) Date: Jan. 6, 2023

(87) PCT Pub. No.: WO2022/008595
PCT Pub. Date: Jan. 13, 2022

(65) Prior Publication Data
US 2023/0262405 A1 Aug. 17, 2023

Related U.S. Application Data

(60) Provisional application No. 63/049,913, filed on Jul. 9, 2020.

(51) Int. Cl.
*H04S 7/00* (2006.01)
*H04S 3/00* (2006.01)

(52) U.S. Cl.
CPC .............. *H04S 7/303* (2013.01); *H04S 3/008* (2013.01); *H04S 2400/01* (2013.01);
(Continued)

(58) Field of Classification Search
CPC .......... H04S 7/302; H04S 7/303; H04S 7/304; H04S 2400/01; H04S 2400/11
See application file for complete search history.

(56) References Cited

U.S. PATENT DOCUMENTS

| | | | | |
|---|---|---|---|---|
| 2019/0246209 | A1* | 8/2019 | Audfray | H04S 7/304 |
| 2021/0092546 | A1* | 3/2021 | Terentiv | H04S 7/303 |
| 2021/0168548 | A1* | 6/2021 | Honma | H04S 7/30 |

FOREIGN PATENT DOCUMENTS

| | | | |
|---|---|---|---|
| WO | 2017/085562 | A2 | 5/2017 |
| WO | 2019/121773 | A1 | 6/2019 |
| WO | 2020/144061 | A1 | 7/2020 |
| WO | 2021/180820 | A1 | 9/2021 |

OTHER PUBLICATIONS

International Search Report and Written Opinion issued in International Application No. PCT/EP2021/068833 dated Oct. 20, 2021 (15 pages).

(Continued)

*Primary Examiner* — Jason R Kurr
(74) *Attorney, Agent, or Firm* — Rothwell, Figg, Ernst & Manbeck, P.C.

(57) ABSTRACT

A method (700) for spatial audio rendering of an audio element having an extent (101). The method includes determining (s702) that a listener is within a transition region that is outside of the extent. The method also includes determining (s704) a first interior rendering with an interior set of virtual loudspeakers. The method also includes determining (s706) an exterior rendering with an exterior set of virtual loudspeakers, wherein the exterior set of virtual loudspeakers comprises first and second virtual loudspeakers. The method also includes, in response to determining that the listener is within the transition region, determining (s708) a transition rendering, wherein the transition rendering includes the interior set of virtual loudspeakers with two loudspeakers in the interior set of virtual loudspeakers
(Continued)

replaced by third and fourth virtual loudspeakers, the third and fourth virtual loudspeakers being based on the first and second virtual loudspeakers of the exterior set of virtual loudspeakers. The method also includes rendering (s710) the transition rendering for the listener.

20 Claims, 10 Drawing Sheets

(52) U.S. Cl.
CPC ....... *H04S 2400/11* (2013.01); *H04S 2400/13* (2013.01); *H04S 2420/01* (2013.01)

(56) References Cited

OTHER PUBLICATIONS

Potard, G. et al., "Decorrelation Techniques for the Rendering of Apparent Sound Source Width in 3D Audio Displays", Proc. of the 7th Int. Conference on Digital Audio Effects (DAFx'04), Naples, Italy, Oct. 5-8, 2004 (5 pages).
Bleidt, R. L. et al., "Development of the MPEG-H TV Audio System for ATSC 3.0", IEEE Transactions on Broadcasting, vol. 63, No. 1, Mar. 2017 (35 pages).
Schissler, C. et al., "Efficient HRTF-based Spatial Audio for Area and Volumetric Sources", IEEE Transactions on Visualization and Computer Graphics, vol. 22, No. 4, Apr. 2016 (11 pages).

* cited by examiner

SEAMLESS RENDERING OF AUDIO ELEMENTS WITH BOTH INTERIOR AND EXTERIOR REPRESENTATIONS

CROSS REFERENCE TO RELATED APPLICATIONS

This application is a 35 U.S.C. § 371 National Stage of International Patent Application No. PCT/EP2021/068833, filed 2021 Jul. 7, which claims priority to U.S. provisional patent application No. 63/049,913, filed on 2020 Jul. 9. The above identified applications are incorporated by this reference.

TECHNICAL FIELD

Disclosed are embodiments related to seamlessly rendering audio elements with both interior and exterior representations.

BACKGROUND

Spatial audio rendering is the process used for presenting audio within virtual reality (VR), augmented reality (AR), or mixed reality (MR), in order to give the listener the impression that the sound is coming from physical sources at a certain position and with a certain size and shape, i.e. extent. The presentation can be made through headphones or speakers. If the presentation is made via headphones, the processing used is called binaural rendering and uses spatial cues of the human spatial hearing that makes it possible to hear from which direction sounds are coming from. The cues involve Inter-aural Time Difference (ITD), Inter-aural Level Difference (ILD), and spectral difference.

The most common form of spatial audio rendering is based on the concept of point-sources, where each sound source is defined to emanate sound from one specific point. A point-source therefor does not have any extent. In order to render a sound source with an extent, different methods have been developed.

One such known method is to create multiple duplicate copies of the mono audio object at positions around the mono object's position. This creates the perception of a spatially homogeneous object with a certain size. This concept is used e.g. in the "object spread" and "object divergence" features of the MPEG-H 3D Audio standard, and in the "object divergence" feature of the EBU Audio Definition Model (ADM) standard. This idea using a mono source has been developed further, where in some cases the area-volumetric geometry of the sound object is projected onto a sphere around the listener and the sound is rendered to the listener using a pair of head-related (HR) filters that is evaluated as the integral of all the HR filters covering the geometric projection of the object on the sphere. For a spherical volumetric source, this integral has an analytical solution, while for an arbitrary area-volumetric source geometry, the integral is evaluated by sampling the projected source surface on the sphere using what is called a Monte Carlo ray sampling.

Another such known method is to render a spatially diffuse component in addition to the mono audio signal, which creates the perception of a somewhat diffuse object that, in contrast to the original mono object, has no distinct pin-point location. This concept is used e.g. in the "object diffuseness" feature of the MPEG-H 3D Audio standard and the EBU ADM "object diffuseness" feature.

Combinations of the two methods above are also known, e.g. the EBU ADM "object extent" feature combines the creation of multiple copies of a mono audio object with addition of diffuse components.

In many cases, the extent of an audio element can be well enough described with a basic shape, e.g. a sphere or box. But sometimes the shape is more complicated and may need to be described in a more detailed form, e.g. with a mesh structure or a parametric description format.

Some audio elements are of the nature that the listener can move inside the extent and expect to hear a plausible audio representation also there. For these audio elements, the extent acts as a spatial boundary that defines the edge between the interior and the exterior of the audio element. Examples of such audio elements may include a forest (sound of birds, wind in the trees), a crowd of people (the sound of people clapping hands or cheering), or the background sound of a city square (sounds of traffic, birds, people walking). When the listener moves within the spatial boundary of the audio element, the audio representation should be immersive and surround the listener. As the listener moves out of the spatial boundary, the representation should now appear to come from the extent of the audio element.

Although these audio elements could be represented as a multitude of individual point-sources, it is more efficient to represent these with a single audio signal. For the interior audio representation, a listener-centric format, where the sound field around the listener is described, is suitable. Listener-centric formats include channel-based formats such as 5.1, 7.1, and scene-based formats such as Ambisonics. Listener-centric formats are typically rendered using several speakers positioned around the listener.

However, there is no well-defined way to render a listener-centric audio signal directly when the listener position is outside of the spatial boundary. Here a source-centric representation is more suitable since the sound source no longer surrounds the listener but should instead be rendered to be coming from a distance in a certain direction. A solution is to use a listener-centric audio signal for the interior representation and derive a source-centric audio signal from that, which can then be rendered using source-centric techniques. The term used for these special kinds of audio elements is spatially-bounded audio elements with interior and exterior representations.

SUMMARY

One challenge with using spatially-bounded audio elements with interior and exterior representations is to make the transition between the interior and the exterior representation smooth and natural sounding. There are no existing solutions for effectively handling this transition. The most straight-forward solution to do seamless transition between an interior and an exterior representation is to render both in parallel and do a simple cross-fade between the two rendered signals when the listener moves within a cross-fade region between the interior and exterior regions. This would however mean more complexity whenever the user is within the cross-fade region since both the interior and exterior renderings need to be executed.

Another problem is that the process of blending the interior and exterior representation may also introduce unwanted frequency cancellations caused by the mixture of multiple closely spaced virtual loudspeakers and the fact that the signals of the different virtual loudspeakers typically have some degree of correlation.

If two (or more) virtual loudspeakers generating correlated audio signals are moving closely to each other, a pronounced comb-filtering effect will be heard that is not present in the original recordings. This effect will be most pronounced for sound sources that are close in position and especially if they are moving, since the character of the comb-filter will change continuously, and that will be disturbing to the listener. This effect is illustrated in FIGS. 4A-4C. FIGS. 4A-4C show the audible artifacts that can be caused by comb-filtering effects of two correlated sound sources with similar positions. The top figure (FIG. 4A) shows the spectrogram of one white noise source rendered through a virtual loudspeaker placed in front of the listener. The middle figure (FIG. 4B) shows the spectrogram of the same white noise source rendered through a virtual loudspeaker that is moving from a position front-right towards front-left, passing through the same position as the virtual speaker in the topmost example. The bottom figure (FIG. 4C) shows a spectrogram of the mix of the two sources in the previous figures. As can be seen, there is a pronounced comb-filtering effect resulting in notches in the spectrum that changes with the relative position of the two sources. The stepwise changes that is seen in FIGS. 4A-4C come from the use of a Head Related Transfer Function (HRTF) dataset with a limited spatial resolution and no interpolation between the HRTF sample-points Accordingly, in one aspect there is provided a method for spatial audio rendering of an audio element having an extent. The method includes determining that a listener is within a transition region that is outside of the extent. The method also includes determining a first interior rendering with an interior set of virtual loudspeakers. The method also includes determining an exterior rendering with an exterior set of virtual loudspeakers, wherein the exterior set of virtual loudspeakers comprises first and second virtual loudspeakers. The method also includes, in response to determining that the listener is within the transition region, determining a transition rendering, wherein the transition rendering includes the interior set of virtual loudspeakers with two loudspeakers in the interior set of virtual loudspeakers replaced by third and fourth virtual loudspeakers, the third and fourth virtual loudspeakers being based on the first and second virtual loudspeakers of the exterior set of virtual loudspeakers. The method also includes rendering the transition rendering for the listener.

In another aspect there is provided a node for spatial audio rendering of an audio element having an extent, wherein the node is configured to perform the methods disclosed herein.

In another aspect there is provided a computer program comprising instructions which when executed by processing circuitry of a node causes the node to perform the methods described herein. In another aspect there is provided a carrier containing the computer program, wherein the carrier is one of an electronic signal, an optical signal, a radio signal, and a computer readable storage medium.

An advantage of the embodiments described herein is that they mitigate the problem of the naïve solution of simple crossfading between the interior and exterior representation by, for example, aligning the positions of the virtual loudspeakers used for the rendering of the interior and exterior representation. The alignment may be done within a transition region close to the extent of the audio element so that the same virtual loudspeakers can be reused for both the interior and exterior representation. This means that the number of needed virtual loudspeakers may not be increased in the transition region, and also that the usage of several closely spaced virtual loudspeakers can be avoided.

The embodiments also make it possible to smoothly transition between the interior and exterior representation of a spatially bounded audio element, without the need for an increased number of virtual loudspeakers and without the audible artifacts that may come from the use of closely spaced virtual loudspeakers with correlated audio signals.

Advantageously, the embodiments are not based on a priori knowledge or assumptions about the shape of the extent of the audio element and therefore may also support complex, irregular shapes.

BRIEF DESCRIPTION OF THE DRAWINGS

The accompanying drawings, which are incorporated herein and form part of the specification, illustrate various embodiments.

DETAILED DESCRIPTION

Figure 1:
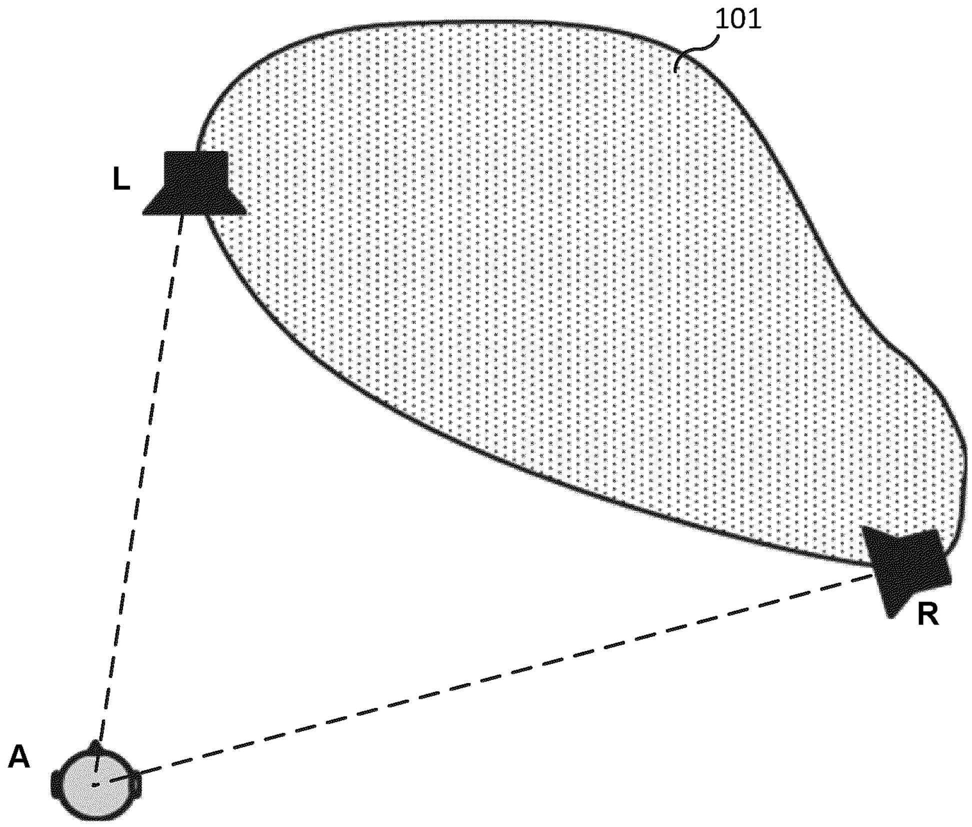
FIG. 1 illustrates an example of a rendering setup for the exterior representation of a spatially bounded audio environment, according to an embodiment.

The rendering of the exterior representation of a spatially bounded audio element is typically based on a number of virtual loudspeakers that are placed in a way that the rendered audio produces a plausible representation of an audio element that radiates sound from the whole of its surface. FIG. 1 illustrates such a system that uses two virtual loudspeakers ("L" and "R") placed at the edges of an extent 101 of an audio element, as seen from the listener position ("A"). This is just an example of such a system and more advanced systems can be designed where a multitude of virtual loudspeakers are distributed in a way so as to convey a sound field that as closely as possible mimics that of a real sound source with the given extent.

Figure 2:
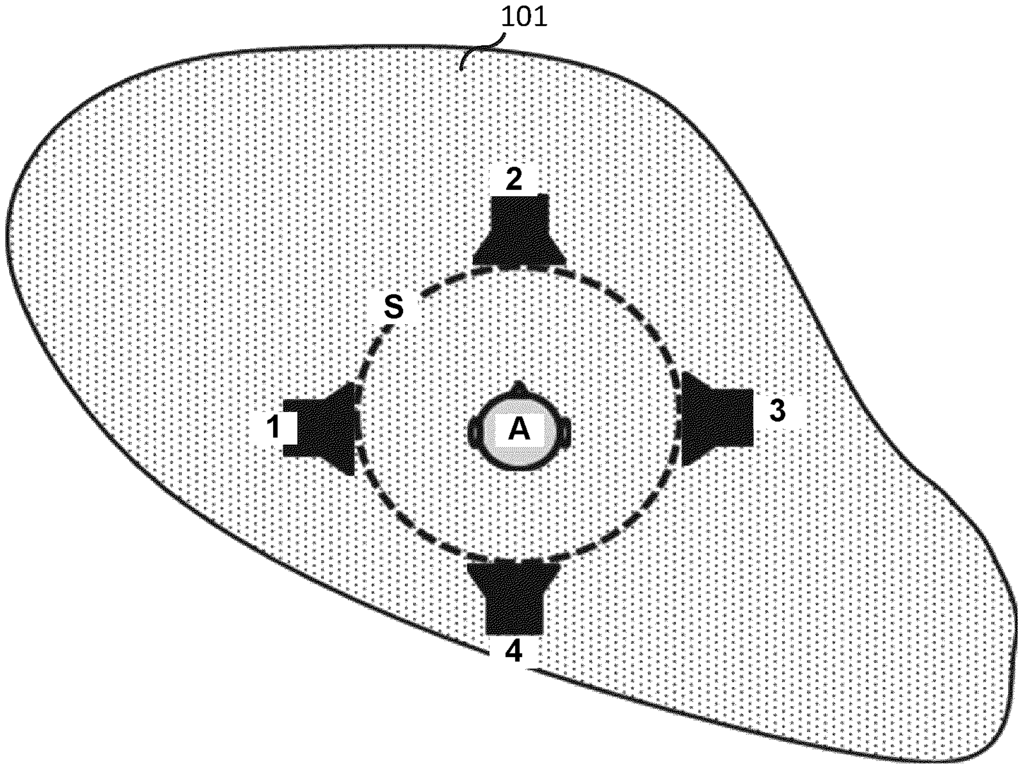
FIG. 2 illustrates an example of a rendering setup for the interior representation of a spatially bounded audio environment, according to an embodiment.

FIG. 2 shows an example of a rendering system for an Ambisonics signal for rendering the interior representation of the audio element, where four virtual loudspeakers (labeled as "1", "2", "3", and "4") are placed on a circle ("S") around the listener ("A") within the extent 101. Typically, more than four virtual loudspeakers are used when rendering Ambisonics signals, but in order to keep the examples simple only four are shown here.

Figure 3:
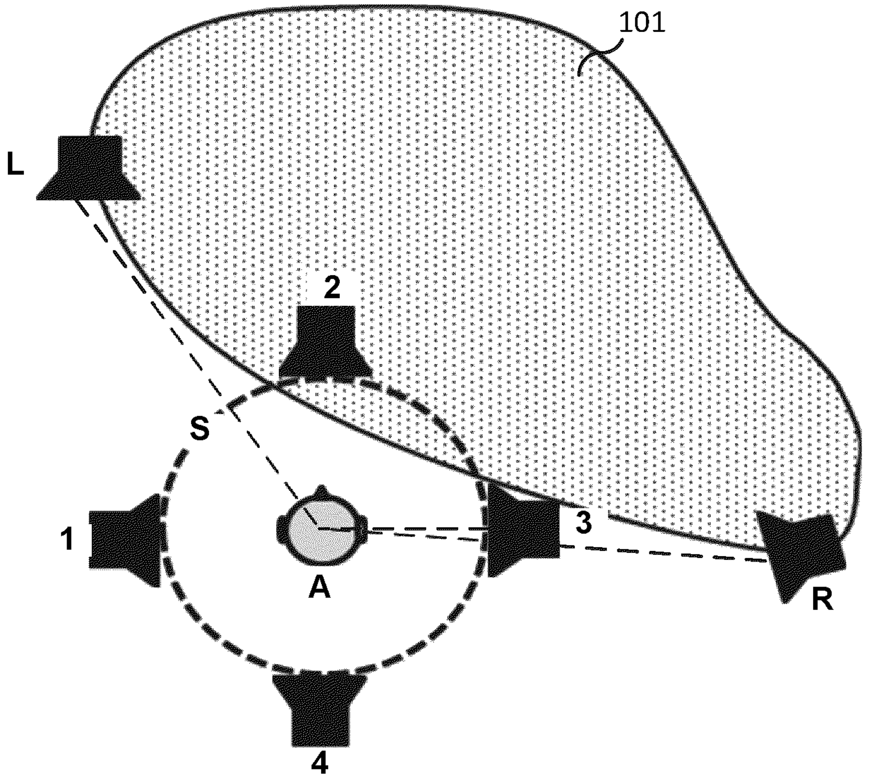
FIG. 3 illustrates an example of a spatially bounded audio environment where the exterior and interior representations may introduce audible artifacts, according to an embodiment.
Figure 4A:
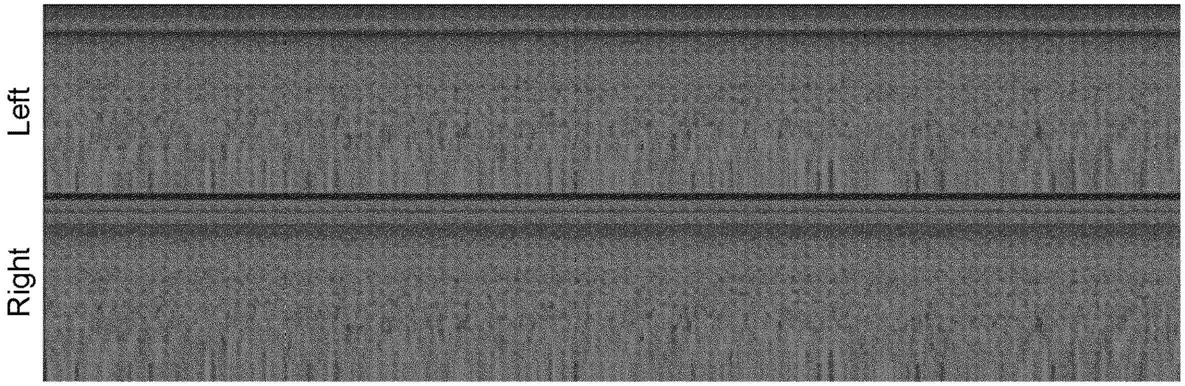
FIGS. 4A-4C illustrate a comb-filtering effect.
Figure 4B:
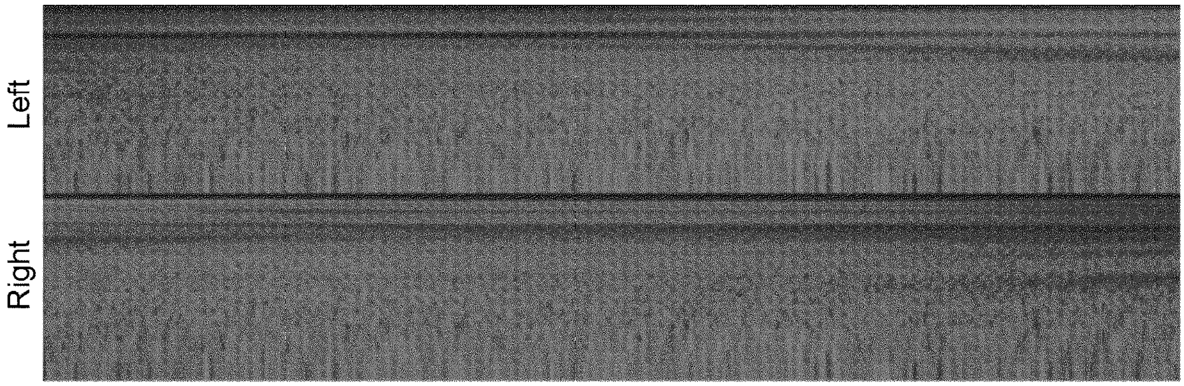
Figure 4C:
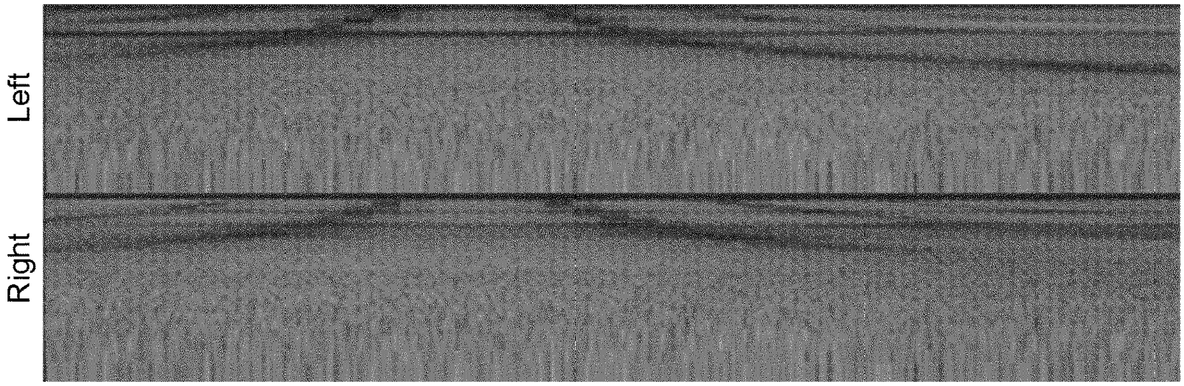

FIG. 3 shows an example of the problem of crossfading between the interior and exterior representation without proper alignment of the involved virtual loudspeakers. The listener ("A") in FIG. 3 is positioned in a transition region between the interior and exterior representations. As seen in the figure, there are two virtual loudspeakers at very similar angles, relative to the listeners position; one from the interior representation (labeled "3") and one from the exterior representation (labeled "R"). The difference in angle will mean the there is a slight difference in Inter-aural Time Difference (ITD), which may cause comb-filtering effects if the audio signals are correlated. Time differences only occur when the horizontal angle of the virtual loudspeakers relative to the listener's head position and pose, often referred to as azimuth angle, is different. The alignment of the horizontal angles of the virtual speakers is more important than alignment in the vertical plane, since differences in angles in the vertical plane does not result in differences in ITD and therefore does not produce comb-filtering artifacts.

Figure 5A:
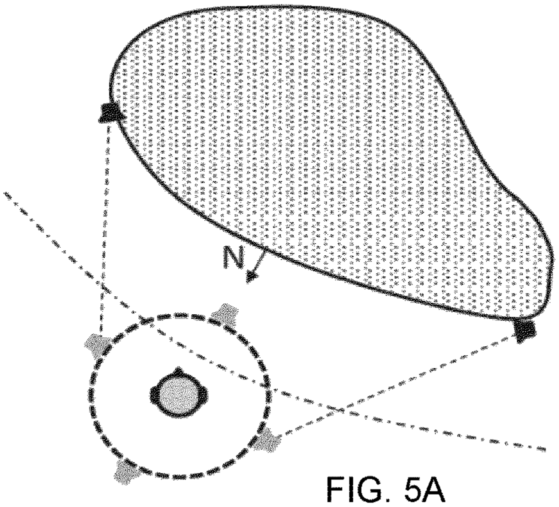
FIGS. 5A-5D illustrate the process of the interpolation of the positions of the reused loudspeakers as the listener moves closer to an extent and eventually crosses through the surface and enters the interior of the extent.
Figure 5B:
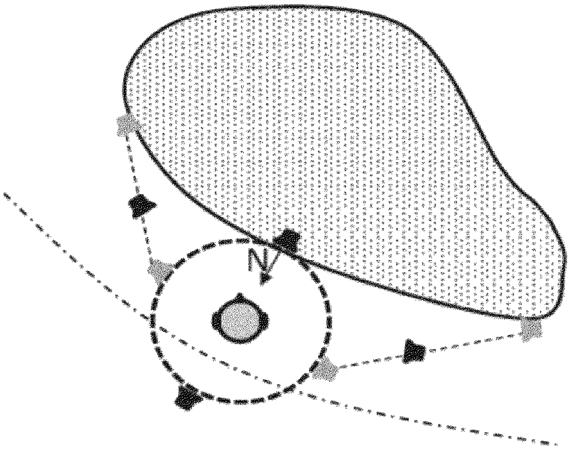
Figure 5C:
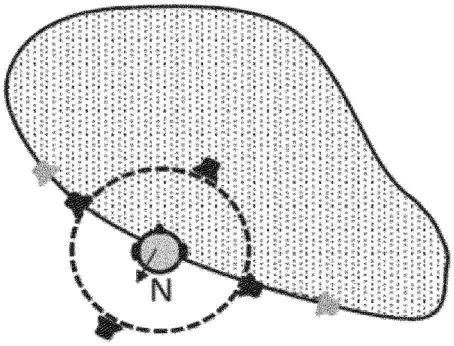

Embodiments reuse a subset of the virtual loudspeakers of the interior representation for the exterior representation. By aligning the interior speaker system to the surface of the extent of the audio element, a smooth transition can be made where the positions of the reused speakers are interpolated from the positions used for the interior and the exterior speaker systems. The alignment may be based on the observation that when the listener just crosses the surface of the extent of the audio element, the exterior representation speaker system would be setup so that it has at least two virtual loudspeakers that are positioned at a 180-degree angle from another, and aligned with the surface of the extent. In this listener position, the interior representation can be rotated so that two of its virtual speakers are positioned in the same directions as the two speakers of the exterior representation speaker system, as shown in FIG. 5C.

The rotation of the speaker system for representing an Ambisonics signal can be adjusted freely as long as the signals going to each speaker are also adjusted accordingly, using rotation in the Ambisonics domain. For example, the signals of each speaker can be calculated by forming a virtual cardiod microphone in the direction of the virtual speaker:

$$m(\theta,p)=p\sqrt{2}w+(1-p)(\cos(\theta)x+\sin(\theta)y),$$

where w, x, and y are the first-order higher order ambisonics (HOA) signals, θ denotes the horizontal angle of the microphone in the Ambisonics coordinate system, and p is a number in the range [0, 1] that describes the polar pattern of the microphone. For a cardioid pattern, p=0.5 should be used. This way the spatial information can be rendered correctly even as the rotation of the virtual speaker system is changed. Other methods may also be used to rotate an Ambisonics signal; the principle is the same, and such methods may also be used in embodiments described here for aligning virtual speakers.

Other listener-centric audio formats than Ambisonics may be used for the interior representation, in which case the method for rotation will be different but the principle is the same as just discussed. Other listener-centric formats include, e.g., a channel-based surround format like 5.1, a Vector Based Amplitude Pruning (VBAP) format, a DirAC format, among others.

FIGS. 5A-5D illustrate the process of the interpolation of the positions of the reused loudspeakers as the listener moves closer to an extent and eventually crosses through the surface and enters the interior of the extent.

Figure 5D:
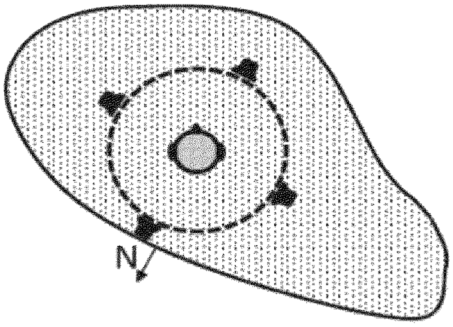

In these figures, the process of smoothly transitioning from the exterior representation to the interior representation rendering setup is shown. Active speakers are represented with black symbols whereas inactive speakers are shown as grey. The dotted lines show what speaker positions are used for interpolation. The dash-dotted line shows where the transition region begins. This region extends all the way around the extent but is only shown for the direction of the listener here. The rotation of the interior representation speaker system is continuously adjusted so that the front speaker is pointing in the negative direction of the surface normal, labeled as N in the figures. In FIG. 5A, the listener is at some distance from the extent where only the exterior representation is rendered. The speakers of the interior representation are greyed out and inactive, while the speakers of the exterior representation are shown in black and active. In FIG. 5B, the listener has entered the transition region where the positions of the left and right speakers of the exterior representation are interpolated towards the position of the left and right speakers of the interior representation speaker system. Two of the interior speakers are shown in grey and inactive, along with the two exterior speakers. Interpolated speakers are shown in black and active between the respective pairs of interior and exterior speakers. In FIG. 5C, the listener is very close to the surface of the extent, so the positions of the left and right speakers of the external representation are substantially coinciding with the speaker positions of the left and right speakers in the interior representation speaker system. The speakers of the interior representation are shown in black and active, while the speakers of the exterior representation are greyed out and inactive. In FIG. 5D, the listener is inside the extent and only the interior representation is used.

Embodiments provide for reusing a subset of the virtual loudspeakers of the interior rendering loudspeaker setup for the exterior rendering. As shown, two of the interior speakers are reused for the exterior rendering; however, in embodiments either more or fewer speakers may be reused.

Embodiments provide for continuously aligning, within a transition region, the rotation of the interior representation speaker system to the surface of the extent, so that there are at least two speakers that line up with the surface as the listener passes through it.

Embodiments provide for interpolating the positions of the reused virtual loudspeakers of the interior representation when the listener is within a transition zone, close to the extent of the audio element. The positions may be interpolated with the corresponding virtual loudspeakers of the exterior representation.

Embodiments provide for cross-fading the signals going to each reused virtual loudspeaker so that a smooth transition can be made between the signals used for the interior representation and the exterior representation.

In embodiments, the transition between the interior and exterior representations is performed within a transition region around the extent. Typically, this region is defined by a transition distance from the surface of the extent but could also be defined in some other way, e.g. explicitly by providing a separate shape description for the transition region in the form of a mesh structure. Regardless of how the transition region is specified, in embodiments the transition is performed starting at the outer edge of the transition region and may complete at the edge of the extent of the audio element. When the listener moves from the inside of the extent to outside of the extent, the reverse transition may be made so that in embodiments the transition is performed starting at the edge of the extent of the audio element and may complete at the outer edge of the transition region.

According to embodiments, when entering the transition region, the transition should begin and the closer to the extent of the audio element the listener position is, the more the transition should transform the rendering setup towards the interior representation rendering setup. When the listener is further away from the audio element extent than as specified by the transition region, only the exterior representation is rendered. When the listener is within the extent of the audio element, only the interior representation is used.

In order to align the interior representation speaker system to the surface of the extent, in some embodiments a target point of on the extent may be identified. The target point may be a point on the extent that the listener is expected to move towards and through which the listener is expected to pass through the surface. This may be determined, for example, based on the listener's prior movements and/or current information about the listener. The normal of the surface of the extent in that point can then be used as a reference direction for the alignment. Depending on how the shape of the extent is described, the process of finding the target point may differ. For simple shapes, such as a sphere, the target point may be defined as the point where a line from the listener position to the center of the sphere crosses the surface of the sphere. For more involved shapes, such as a complex mesh, the process may involve a search for the closest point to the listener, on any triangle of the mesh.

In the case of the rendering system (such as depicted in FIGS. 5A-5D), the rendering system should be rotated so that the front speaker is pointing in the negative direction of the surface normal. By doing this, the left and right speakers of the rendering system will align with the surface. For other speaker setups, there might not be a front speaker, but there may be at least two speakers 180 degrees apart in the horizontal plane, that can be used to represent the right and left directions when the listener is at the surface of the extent.

The transition of each reused speaker may entail two aspects. First, the position of the speaker may be transitioned from the position as would be used by the exterior representation, up to the position that would be used by the interior representation. Second, the signal of the speaker may be transitioned from the signal that would be used for the exterior representation, to the signal that would be used by the interior representation.

In some embodiments, the signals for the interior and exterior representations are the same, but usually there is at least a difference in volume since the number of speakers for rendering the interior and exterior representations often differs.

A description for illustrative purposes of one way to do linear interpolation of both the position and signals of the reused loudspeakers follows. Other types of linear interpolation, and other types of interpolation besides linear interpolation, are also within the scope of disclosed embodiments. Many variants of interpolation methods can be applied here that would slightly change the behavior of the interpolation, but not change the essence of the invention.

The transition of both the position and signal can be a simple linear interpolation controlled by the distance d from the listener position to the surface of the extent, compared to a transition distance $D_T$. In this case, a ratio r between the interior representation and the exterior representation can be calculated as $$r = \begin{cases} 0, & d > D_T \\ \frac{D_T - d}{D_T}, & 0 \le d \le D_T \\ 1, & d < 0 \end{cases}$$

Here the transition ratio r denotes how much of the interior representation should be heard. A negative distance d here means that the listener position is inside the extent.

The rater can then be used to calculate an interpolated position p of one virtual loudspeaker as $p = rp_1 + (1-r)p_E$, where $p_1$ denotes the point where the loudspeaker would be placed for the interior representation and $p_E$ denotes the point where the loudspeaker would be placed for the exterior representation.

Similarly, the time discrete signal s(n) going to each reused loudspeaker can be interpolated between the interior and exterior signals as $s(n) = rks_1(n) + (1-r)s_E(n)$, where $s_1(n)$ denotes the signal that would be used for the interior representation and $s_E(n)$ denotes the signals that would be used for the exterior representation. An extra factor k is introduced serving as a gain compensation to compensate for the fact that different numbers of loudspeakers are often used for the interior and exterior representations. The exact value of k may vary depending on how the signals for the exterior representation have been derived from the interior representation signals, but in the simplest case k may be calculated $$k = \frac{N_E}{N_I},$$

where $N_E$ is the number of loudspeakers used for the exterior representation and $N_1$ is the number of loudspeakers used for the interior representation. This gain compensation assumes that there is a high degree of correlation among the channels of the interior representation, which is typically the case for Ambisonic signals.

In addition to the interpolation between the signals for the interior and exterior representations, the signals for the interior representation may also be modified in order to improve the illusion of being at the edge of the extent. By adding an extra gain factor to the loudspeaker positions residing in the rear hemisphere, these loudspeakers can be suppressed until the listener moves some distance into the extent. This would be more in line with how the sound field would behave when just entering, e.g. a forest, since the listener should mainly hear sound coming from the direction of the extent rather than from all directions. The rear hemisphere part of the loudspeaker setup for the interior representation should then be completely suppressed until the listener moves inside the extent and the be successively increased in volume when the listener moves further inside the extent.

This behavior can be achieved in embodiments with an internal fade region inside the extent for the rear hemisphere of the loudspeaker setup of the internal representation. If we let $g_F$ denote the gain applied to the rear speakers, then using a similar calculation as for the transition ratio $$g_F = \begin{cases} 0, & d > 0 \\ \frac{-d}{D_F}, & -D_F \le d \le 0 \\ 1, & d < -D_F \end{cases}$$

where $D_F$ defines a distance from the extent surface where this fade-in occurs. Notice that the distance is negative here since the listener is inside the extent. When the listener is right at the surface of the extent, these loudspeakers are silent and when moving further inside the extent, the loudspeakers will be faded in until the listener reached a distance greater than $D_F$ from the surface and then $g_F$ is set to 1 and the interior representation is rendered with full immersion.

Figure 9:
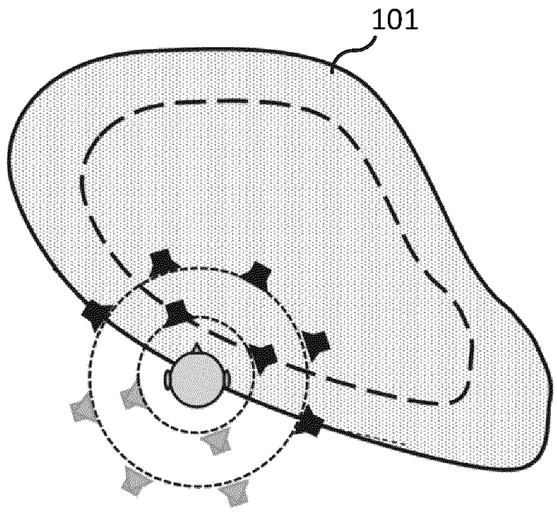
FIG. 9 shows an example of a spherical loudspeaker setup with several elevation layers for rendering an interior representation.

FIG. 9 shows an example of a spherical loudspeaker setup with several elevation layers for rendering an interior representation of extent 101. When the listener is right at the edge of the extent 101, the speakers in the rear hemisphere are representing directions from where no sound is expected, and should therefore be attenuated. These speakers are shown as grey in FIG. 9.

Like the transition region, this fade region can be described in other ways than a fixed fade-in distance. The region can be specified separately as its own shape that is not based directly on the shape of the extent.

In order to support arbitrary shapes (e.g., for a transition region or an internal fade region), the transition may be based on the distance from the listener position to a specific target point on the extent. Exemplary ways of choosing this target point are now described.

In order to calculate the distance to the extent and to identify the normal of the surface of the extent, which the exterior loudspeaker system should be aligned with, a target point on the extent may be found that represents the point that the listener is expected to pass through when moving towards the extent. Similarly, when the listener is inside the extent, the distance may be calculated from the point where the listener is expected to pass through when moving out of the extent.

The target point is not necessarily the closest point on the extent. As an example, when a listener is moving inside a forest, which extent is described by a big mesh shape, the closest point of this mesh to the listener is probably most of the time a point on the ground. But this point is probably not the point where the listener is going to pass through. It is more likely that the user will pass through the extent at a point in the direction of the current movement. As long as only horizontal alignment is done, the search for an entry/exit point can be limited to parts of the surface that represent the horizontal boundary of the extent. In other words, the process of finding the target point depends on the application. When the target point has been identified, the process of finding the distance and the normal of the surface at that point is well known to a person skilled in the art.

For some extents, the use of a target point for calculating a transition ratio is not needed. Examples of this may include a simple sphere shape where the transition can be controlled directly by comparing the distance of the listener position to the center of the sphere and the radius of the sphere. Other shapes may be specified using parametrical formulas, in which case the transition region may also be specified in a similar manner.

Figure 6:
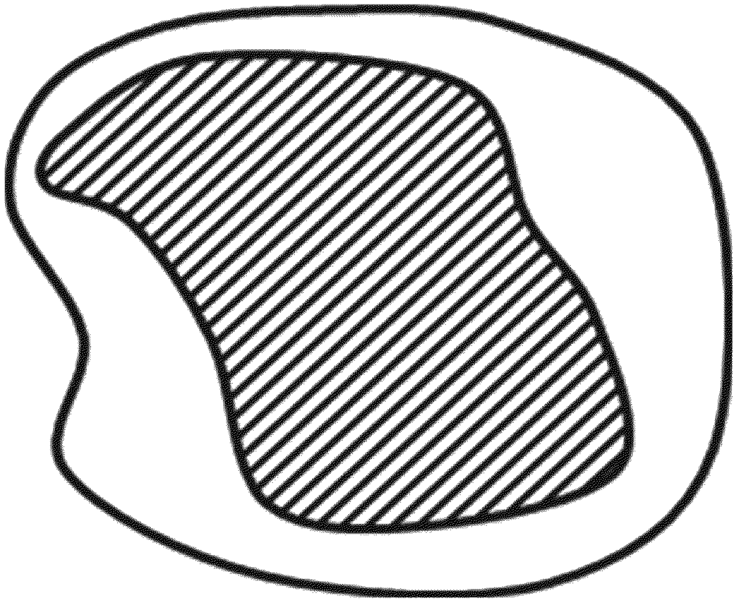
FIG. 6 illustrates an example of a spatially bounded audio environment, according to an embodiment.

The transition region may be specified to have a different shape than the extent of the audio element. An example of such a case can be seen in FIG. 6. This figure shows an example of an audio element extent and a transition region with a different shape that is not based on a fixed distance from the extent. The audio rendering within the transition region proceeds as described elsewhere, namely, that the transition starts at the outer edge of the transition region and completes at the edge of the extent of the audio element, when the listener is moving from the outside to the inside of the audio element. The reverse transition may be done if the listener moves from the inside of the extent and outwards.

So far, the description of certain embodiments has described primarily the reuse of the loudspeakers representing the left-right dimension. It is possible, however, to use the same principles to reuse other speakers, such as those representing the up-down dimension or the loudspeaker representing the forward direction, towards the extent.

In order to make a seamless transition with the reused loudspeakers, an appropriate loudspeaker setup needs to be chosen for both the interior and exterior representations. If loudspeakers representing the up-down dimension are to be reused, the loudspeaker setup of the interior representation should include loudspeaker positions at both positive and negative elevations. Also, the loudspeaker setup for the exterior representation should include positions that represent the height dimension of the extent.

If the speaker setup of the exterior representation includes several positions spread out over the horizontal plane dimension of the extent, these loudspeakers could all be reused for the interior representation if that speaker setup has at least that many speakers in its horizontal plane in the frontal hemisphere. The simplest example of that is the case where the exterior representation is rendered using a three-loudspeaker setup with a left, right and a center speaker. The center speaker could then be reused as the front loudspeaker in the loudspeaker setup of the interior representation given that there is a loudspeaker in the direct frontal direction.

So far, the description of certain embodiments has described the alignment of the speaker system of the interior representation to the extent primarily in the horizontal plane. For many situations, a horizontal-only alignment is sufficient since the listener is typically mostly moving about in the horizontal plane and the cues of the auditory system is most sensitive to differences in positions in the horizontal plane, relative to the head pose. Still, there are situations where the alignment would be improved by also taking non-horizontal planes into account. Doing so is within the scope of the disclosed embodiments.

One way to do alignment in both the horizontal and vertical plane, for example, is to define a local coordinate system based on the vector from the listener position to the target point. If this vector has a vertical tilt, the horizontal plane of the local coordinate system will then be tilted in the same direction. By doing the calculations of the alignment of the rotation of the exterior representation speaker setup within the local coordinate system and then transform the rotation and speaker positions back to the global coordinate system, the vertical tilt will be incorporated in the alignment.

An exemplary method for providing seamless rendering of audio elements with both interior and exterior representations is now described. The method may include identifying a target point on the extent surface that the listener is expected to move towards and calculating the surface normal at the target point. The method may further include aligning the rotation of the loudspeaker system of the interior representation so that at least two of its loudspeakers are lining up with the surface, one to the left and one to the right, as seen from the listener position. The method may further include calculating a rate between the interior and exterior representation based on the distance between the listener and the target point and the size of the transition region. The method may further include, based on the calculated rate, interpolating between the loudspeaker positions used for the exterior and interior representations for the reused loudspeakers and interpolating between the loudspeaker signals used for the exterior and interior representations for the reused loudspeakers.

Figure 7:
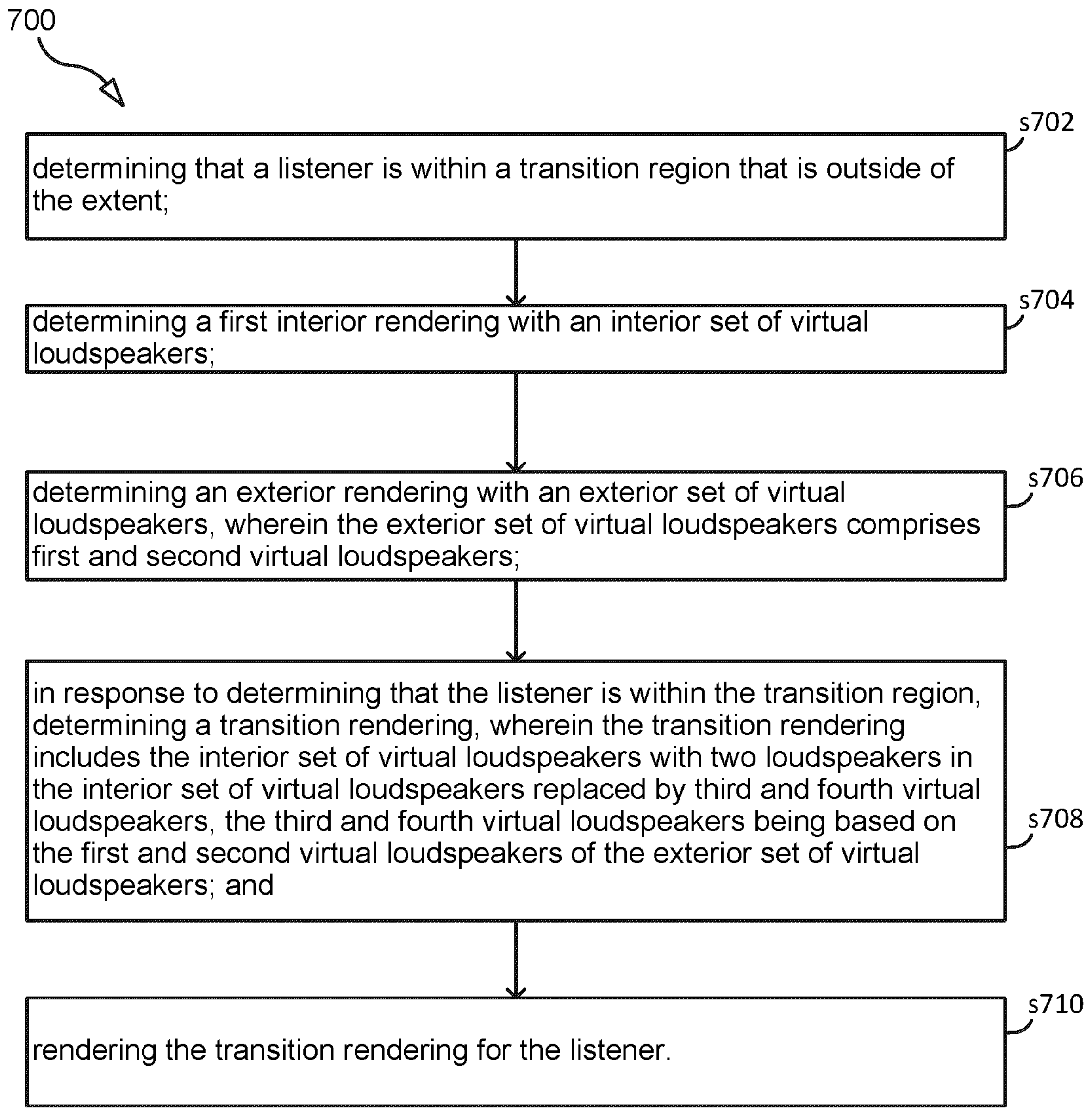
FIG. 7 is a flow chart illustrating a process according to an embodiment.

FIG. 7 is a flow chart illustrating a process according to an embodiment. Process 700 is a method for spatial audio rendering of an audio element having an extent. The method may begin with step s702.

Step s702 comprises determining that a listener is within a transition region that is outside of the extent.

Step s704 comprises determining a first interior rendering with an interior set of virtual loudspeakers.

Step s706 comprises determining an exterior rendering with an exterior set of virtual loudspeakers, wherein the exterior set of virtual loudspeakers comprises first and second virtual loudspeakers.

Step s708 comprises, in response to determining that the listener is within the transition region, determining a transition rendering, wherein the transition rendering includes the interior set of virtual loudspeakers with two loudspeakers in the interior set of virtual loudspeakers replaced by third and fourth virtual loudspeakers, the third and fourth virtual loudspeakers being based on the first and second virtual loudspeakers of the exterior set of virtual loudspeakers.

Step s710 comprises rendering the transition rendering for the listener.

In some embodiments, the transition region comprises points outside of the extent within a threshold distance of the extent. In some embodiments, the third virtual loudspeakers has a position based on interpolating positions of the first virtual loudspeaker and the one of the two loudspeakers in the interior set of virtual loudspeakers that is replaced by the third virtual loudspeaker, and the fourth virtual loudspeakers has a position based on interpolating positions of the second virtual loudspeaker and the one of the two loudspeakers in the interior set of virtual loudspeakers that is replaced by the fourth virtual loudspeaker. In some embodiments, the method further includes determining a second interior rendering by rotating the interior set of virtual loudspeakers based on a surface normal of the extent. In some embodiments, a front speaker of the interior set of virtual loudspeakers is aligned with a negative direction of the surface normal of the extent when rotated.

In some embodiments, rendering the transition rendering for the listener comprises cross-fading the audio signal of the first virtual loudspeaker of the exterior set of virtual loudspeakers with the one of the two loudspeakers in the interior set of virtual loudspeakers that is replaced by the third virtual loudspeaker and cross-fading the audio signal of the second virtual loudspeaker of the exterior set of virtual loudspeakers with the one of the two loudspeakers in the interior set of virtual loudspeakers that is replaced by the fourth virtual loudspeaker. In some embodiments, the threshold distance of the extent is a fixed value. In some embodiments, the threshold distance of the extent is a function of a position of the listener with respect to a boundary of the extent.

In some embodiments, the method further includes: while rendering the transition rendering, determining a second interior rendering, wherein the second interior rendering applies a gain reduction to a virtual loudspeaker in the interior set of virtual loudspeakers located in a rear hemisphere; and rendering the second interior rendering for the listener. In some embodiments the method further includes, while rendering the transition rendering for the listener, determining that the listener is within an internal fade region that is inside of the extent; in response to determining that the listener is within the internal fade region, determining a second interior rendering, wherein the second interior rendering applies a gain g to a virtual loudspeaker in the interior set of virtual loudspeakers located in a rear hemisphere; and rendering the second interior rendering for the listener. In some embodiments, the internal fade region comprises points inside of the extent within a threshold distance of a boundary of the extent. In some embodiments, the gain ($g_F$) can be defined as $$g_F = \frac{-d}{D_F}$$

when the listener is within the internal fade region (e.g., when $-D_F \leq d \leq 0$), where d is a distance of the listener from a boundary of the extent and $D_F$ is a constant. When the listener is outside the extent, the gain can be set to 0.

Figure 8:
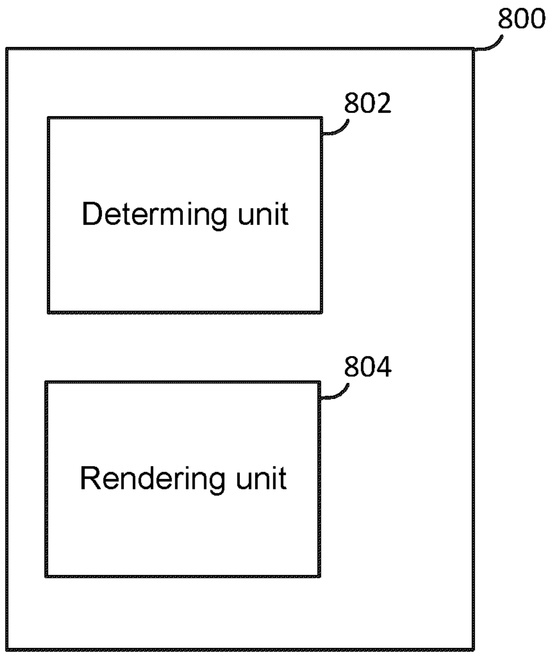
FIG. 8 is a diagram showing functional units of a rendering node, according to embodiments.

FIG. 8 is a diagram showing functional units of a node 800 (e.g., an audio renderer), according to embodiments. Node 800 includes a determining unit 802 and a rendering unit 804, and may be used for spatial audio rendering of an audio element having an extent.

Determining unit 802 is configured to determine that a listener is within a transition region that is outside of the extent.

Determining unit 802 is further configured to determine a first interior rendering with an interior set of virtual loudspeakers.

Determining unit 802 is further configured to determine an exterior rendering with an exterior set of virtual loudspeakers, wherein the exterior set of virtual loudspeakers comprises first and second virtual loudspeakers.

Determining unit 802 is further configured, in response to determining that the listener is within the transition region, to determine a transition rendering, wherein the transition rendering includes the interior set of virtual loudspeakers with two loudspeakers in the interior set of virtual loudspeakers replaced by third and fourth virtual loudspeakers, the third and fourth virtual loudspeakers being based on the first and second virtual loudspeakers of the exterior set of virtual loudspeakers.

Rendering unit 804 is configured to render the transition rendering for the listener.

Figure 10:
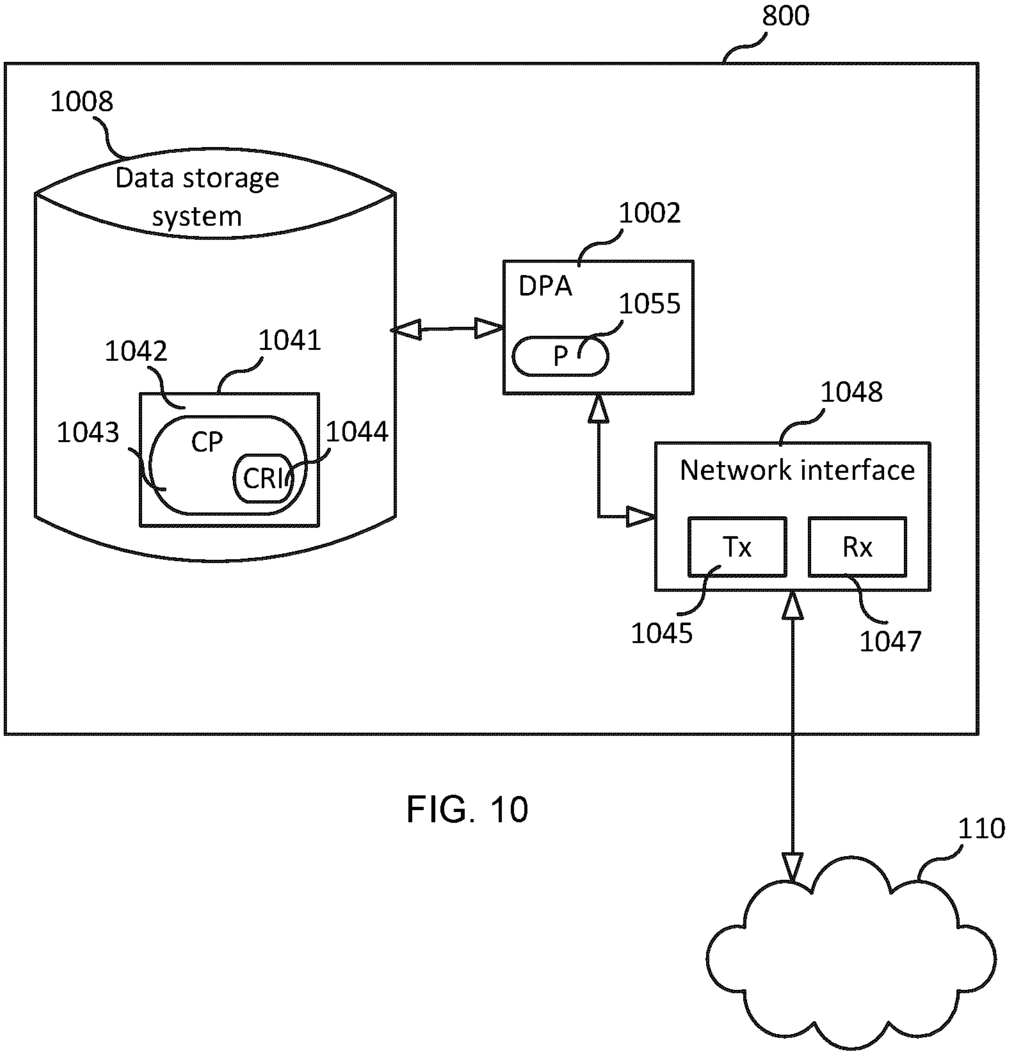
FIG. 10 is a block diagram of a node, according to embodiments.

FIG. 10 is a block diagram of a node (such as node 800), according to some embodiments. As shown in FIG. 10, the node may comprise: processing circuitry (PC) 1002, which may include one or more processors (P) 1055 (e.g., a general purpose microprocessor and/or one or more other processors, such as an application specific integrated circuit (ASIC), field-programmable gate arrays (FPGAs), and the like); a network interface 1448 comprising a transmitter (Tx) 1045 and a receiver (Rx) 1047 for enabling the node to transmit data to and receive data from other nodes connected to a network 110 (e.g., an Internet Protocol (IP) network) to which network interface 1048 is connected; and a local storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like.

In some embodiments, the CRI 1044 of computer program 1043 is configured such that when executed by PC 1002, the CRI causes the node to perform steps described herein (e.g., steps described herein with reference to the flow charts). In other embodiments, the node may be configured to perform steps described herein without the need for code. That is, for example, PC 1002 may consist merely of one or more ASICs. Hence, the features of the embodiments described herein may be implemented in hardware and/or software.

Summary of Various Embodiments

A1. A method for spatial audio rendering of an audio element having an extent, the method comprising: determining that a listener is within a transition region that is outside of the extent; determining a first interior rendering with an interior set of virtual loudspeakers; determining an exterior rendering with an exterior set of virtual loudspeakers, wherein the exterior set of virtual loudspeakers comprises first and second virtual loudspeakers; in response to determining that the listener is within the transition region, determining a transition rendering, wherein the transition rendering includes the interior set of virtual loudspeakers with two loudspeakers in the interior set of virtual loudspeakers replaced by third and fourth virtual loudspeakers, the third and fourth virtual loudspeakers being based on the first and second virtual loudspeakers of the exterior set of virtual loudspeakers; and rendering the transition rendering for the listener.

A2. The method of embodiment A1, wherein the transition region comprises points outside of the extent within a threshold distance of the extent.

A3. The method of embodiment A1 or A2, wherein the third virtual loudspeakers has a position based on interpolating positions of the first virtual loudspeaker and the one of the two loudspeakers in the interior set of virtual loudspeakers that is replaced by the third virtual loudspeaker, and the fourth virtual loudspeakers has a position based on interpolating positions of the second virtual loudspeaker and the one of the two loudspeakers in the interior set of virtual loudspeakers that is replaced by the fourth virtual loudspeaker.

A4. The method of any one of embodiments A1-A3, further comprising determining a second interior rendering by rotating the interior set of virtual loudspeakers based on a surface normal of the extent.

A5. The method of embodiment A4, wherein a front speaker of the interior set of virtual loudspeakers is aligned with a negative direction of the surface normal of the extent when rotated.

A6. The method of any one of embodiments A1-A5, wherein rendering the transition rendering for the listener comprises cross-fading the audio signal of the first virtual loudspeaker of the exterior set of virtual loudspeakers with the one of the two loudspeakers in the interior set of virtual loudspeakers that is replaced by the third virtual loudspeaker and cross-fading the audio signal of the second virtual loudspeaker of the exterior set of virtual loudspeakers with the one of the two loudspeakers in the interior set of virtual loudspeakers that is replaced by the fourth virtual loudspeaker.

A7. The method of any one of embodiments A2-A6, wherein the threshold distance of the extent is a fixed value.

A8. The method of any one of embodiments A2-A6, wherein the threshold distance of the extent is a function of a position of the listener with respect to a boundary of the extent.

A9. The method of any one of embodiments A1-A8, the method further comprising: when rendering the transition rendering for the listener, determining that the listener is either outside the extent or within an internal fade region that is inside of the extent; in response to determining that the listener is either outside the extent or within the internal fade region, determining a second interior rendering, wherein the second interior rendering applies a gain $g_F$ to a virtual loudspeaker in the interior set of virtual loudspeakers located in a rear hemisphere; and rendering the second interior rendering for the listener.

A10. The method of embodiment A9, wherein the internal fade region comprises points inside of the extent within a threshold distance of a boundary of the extent.

A11. The method of any one of embodiments A9-A10, wherein, when the listener is outside the extent, then the gain gF is 0, and when the listener is within an internal fade region, then the gain $$g_F = \frac{-d}{D_F},$$

where d is a distance of the listener from a boundary of the extent and $D_F$ is a constant.

B1. A node (e.g., an audio renderer) for spatial audio rendering of an audio element having an extent, the node being adapted to: determine that a listener is within a transition region that is outside of the extent; determine a first interior rendering with an interior set of virtual loudspeakers; determine an exterior rendering with an exterior set of virtual loudspeakers, wherein the exterior set of virtual loudspeakers comprises first and second virtual loudspeakers; in response to determining that the listener is within the transition region, determine a transition rendering, wherein the transition rendering includes the interior set of virtual loudspeakers with two loudspeakers in the interior set of virtual loudspeakers replaced by third and fourth virtual loudspeakers, the third and fourth virtual loudspeakers being based on the first and second virtual loudspeakers of the exterior set of virtual loudspeakers; and render the transition rendering for the listener.

B1a. The node of embodiment B1, wherein the transition region comprises points outside of the extent within a threshold distance of the extent.

B2. The node of embodiment B1 or B1a, wherein the third virtual loudspeakers has a position based on interpolating positions of the first virtual loudspeaker and the one of the two loudspeakers in the interior set of virtual loudspeakers that is replaced by the third virtual loudspeaker, and the fourth virtual loudspeakers has a position based on interpolating positions of the second virtual loudspeaker and the one of the two loudspeakers in the interior set of virtual loudspeakers that is replaced by the fourth virtual loudspeaker.

B3. The node of any one of embodiments B1-B2, further being adapted to determine a second interior rendering by rotating the interior set of virtual loudspeakers based on a surface normal of the extent.

B4. The node of embodiment B3, wherein a front speaker of the interior set of virtual loudspeakers is aligned with a negative direction of the surface normal of the extent when rotated.

B5. The node of any one of embodiments B1-B4, wherein rendering the transition rendering for the listener comprises cross-fading the audio signal of the first virtual loudspeaker of the exterior set of virtual loudspeakers with the one of the two loudspeakers in the interior set of virtual loudspeakers that is replaced by the third virtual loudspeaker and cross-fading the audio signal of the second virtual loudspeaker of the exterior set of virtual loudspeakers with the one of the two loudspeakers in the interior set of virtual loudspeakers that is replaced by the fourth virtual loudspeaker.

B6. The node of any one of embodiments B1a-B5, wherein the threshold distance of the extent is a fixed value.

B7. The node of any one of embodiments B1a-B5, wherein the threshold distance of the extent is a function of a position of the listener with respect to a boundary of the extent.

B8. The node of any one of embodiments B1-B7, the node being further adapted to: after rendering the transition rendering for the listener, determine that the listener is within an internal fade region that is inside of the extent; in response to determining that the listener is within the internal fade region, determine a second interior rendering, wherein the second interior rendering applies a gain $g_F$ to a virtual loudspeaker in the interior set of virtual loudspeakers located in a rear hemisphere; and render the second interior rendering for the listener.

B9. The node of embodiment B8, wherein the internal fade region comprises points inside of the extent within a threshold distance of a boundary of the extent.

B10. The node of any one of embodiments B8-B9, wherein the gain $$g_F = \frac{-d}{D_F},$$

where d is a distance of the listener from a boundary of the extent and $D_F$ is a constant.

C1. A computer program comprising instructions which when executed by processing circuitry of a node causes the node to perform the method of any one of A1-A10.

C2. A carrier containing the computer program of embodiment C1, wherein the carrier is one of an electronic signal, an optical signal, a radio signal, and a computer readable storage medium.

CONCLUSION

As disclosed above, the embodiments described herein mitigate the problem of the naïve solution of simple cross-fading between the interior and exterior representation by aligning the positions of the virtual loudspeakers used for the rendering of the interior and exterior representation. The alignment may be done within a transition region close to the extent of the audio element so that the same virtual loudspeakers can be reused for both the interior and exterior representation. This means that the number of needed virtual loudspeakers may not be increased in the transition region, and also that the usage of several closely spaced virtual loudspeakers can be avoided.

The embodiments make it possible to smoothly transition between the interior and exterior representation of a spatially bounded audio element, without the need for an increased number of virtual loudspeakers and without the audible artifacts that may come from the use of closely spaced virtual loudspeakers with correlated audio signals.

The embodiments are not based on a priori knowledge or assumptions about the shape of the extent of the audio element and therefore may also support complex, irregular shapes.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for spatial audio rendering of an audio element having an extent, the method comprising:

determining that a listener is within a transition region that is outside of the extent;

determining a first interior rendering with an interior set of virtual loudspeakers;

determining an exterior rendering with an exterior set of virtual loudspeakers, wherein the exterior set of virtual loudspeakers comprises first and second virtual loudspeakers;

in response to determining that the listener is within the transition region, determining a transition rendering, wherein the transition rendering includes the interior set of virtual loudspeakers with two loudspeakers in the interior set of virtual loudspeakers replaced by third and fourth virtual loudspeakers, the third and fourth virtual loudspeakers being based on the first and second virtual loudspeakers of the exterior set of virtual loudspeakers; and rendering the transition rendering for the listener.

2. The method of claim 1, wherein the transition region comprises points outside of the extent within a threshold distance of the extent.

3. The method of claim 2, wherein the threshold distance of the extent is a fixed value or a function of a position of the listener with respect to a boundary of the extent.

4. The method of claim 1, wherein the third virtual loudspeakers has a position based on interpolating positions of the first virtual loudspeaker and the one of the two loudspeakers in the interior set of virtual loudspeakers that is replaced by the third virtual loudspeaker, and the fourth virtual loudspeakers has a position based on interpolating positions of the second virtual loudspeaker and the one of the two loudspeakers in the interior set of virtual loudspeakers that is replaced by the fourth virtual loudspeaker.

5. The method of claim 1, further comprising determining a second interior rendering by rotating the interior set of virtual loudspeakers based on a surface normal of the extent.

6. The method of claim 5, wherein a front speaker of the interior set of virtual loudspeakers is aligned with a negative direction of the surface normal of the extent when rotated.

7. The method of claim 1, wherein rendering the transition rendering for the listener comprises cross-fading the audio signal of the first virtual loudspeaker of the exterior set of virtual loudspeakers with the one of the two loudspeakers in the interior set of virtual loudspeakers that is replaced by the third virtual loudspeaker and cross-fading the audio signal of the second virtual loudspeaker of the exterior set of virtual loudspeakers with the one of the two loudspeakers in the interior set of virtual loudspeakers that is replaced by the fourth virtual loudspeaker.

8. The method of claim 1, the method further comprising:

when rendering the transition rendering for the listener, determining that the listener is either outside the extent or within an internal fade region that is inside of the extent;

in response to determining that the listener is either outside the extent or within the internal fade region, determining a second interior rendering, wherein the second interior rendering applies a gain $g_F$ to a virtual loudspeaker in the interior set of virtual loudspeakers located in a rear hemisphere; and rendering the second interior rendering for the listener.

9. The method of claim 8, wherein the internal fade region comprises points inside of the extent within a threshold distance of a boundary of the extent.

10. The method of claim 8, wherein, when the listener is outside the extent, then the gain gF is 0, and when the listener is within an internal fade region, then the gain $$g_F = \frac{-d}{D_F},$$

where d is a distance of the listener from a boundary of the extent and $D_F$ is a constant.

11. A node for spatial audio rendering of an audio element having an extent, the node being configured to:

determine that a listener is within a transition region that is outside of the extent;

determine a first interior rendering with an interior set of virtual loudspeakers;

determine an exterior rendering with an exterior set of virtual loudspeakers, wherein the exterior set of virtual loudspeakers comprises first and second virtual loudspeakers;

in response to determining that the listener is within the transition region, determine a transition rendering, wherein the transition rendering includes the interior set of virtual loudspeakers with two loudspeakers in the interior set of virtual loudspeakers replaced by third and fourth virtual loudspeakers, the third and fourth virtual loudspeakers being based on the first and second virtual loudspeakers of the exterior set of virtual loudspeakers; and render the transition rendering for the listener.

12. The node of claim 11, wherein the transition region comprises points outside of the extent within a threshold distance of the extent.

13. The node of claim 12, wherein the threshold distance of the extent is a fixed value or a function of a position of the listener with respect to a boundary of the extent.

14. The node of claim 11, wherein the third virtual loudspeakers has a position based on interpolating positions of the first virtual loudspeaker and the one of the two loudspeakers in the interior set of virtual loudspeakers that is replaced by the third virtual loudspeaker, and the fourth virtual loudspeakers has a position based on interpolating positions of the second virtual loudspeaker and the one of the two loudspeakers in the interior set of virtual loudspeakers that is replaced by the fourth virtual loudspeaker.

15. The node of claim 11, further being adapted to determine a second interior rendering by rotating the interior set of virtual loudspeakers based on a surface normal of the extent.

16. The node of claim 15, wherein a front speaker of the interior set of virtual loudspeakers is aligned with a negative direction of the surface normal of the extent when rotated.

17. The node of claim 11, wherein rendering the transition rendering for the listener comprises cross-fading the audio signal of the first virtual loudspeaker of the exterior set of virtual loudspeakers with the one of the two loudspeakers in the interior set of virtual loudspeakers that is replaced by the third virtual loudspeaker and cross-fading the audio signal of the second virtual loudspeaker of the exterior set of virtual loudspeakers with the one of the two loudspeakers in the interior set of virtual loudspeakers that is replaced by the fourth virtual loudspeaker.

18. The node of claim 11, the node being further adapted to:

when rendering the transition rendering for the listener, determine whether the listener is either outside the extent or within an internal fade region that is inside of the extent;

in response to determining that the listener is either outside the extent or within the internal fade region, determine a second interior rendering, wherein the second interior rendering applies a gain $g_F$ to a virtual loudspeaker in the interior set of virtual loudspeakers located in a rear hemisphere; and render the second interior rendering for the listener.

19. The node of claim 18, wherein the internal fade region comprises points inside of the extent within a threshold distance of a boundary of the extent.

20. The node of claim 18, wherein, when the listener is outside the extent, then the gain gF is 0, and when the listener is within an internal fade region, then the gain $$g_F = \frac{-d}{D_F},$$

where d is a distance of the listener from a boundary of the extent and $D_F$ is a constant.

* * * * *